United States Patent
Suh et al.

[11] Patent Number: 5,956,117
[45] Date of Patent: Sep. 21, 1999

[54] EYEGLASSES WITH HEAD EMBRACING TEMPLE

[76] Inventors: J. S. Suh, 178 Wildflower Dr., Plymouth Meeting, Pa. 19462; Van T. Pham, 555 Main St., East Greenville, Pa. 18041

[21] Appl. No.: 08/909,027

[22] Filed: Aug. 11, 1997

[51] Int. Cl.⁶ .................. G02C 3/00; G02C 5/14
[52] U.S. Cl. .................. 351/156; 351/119; 351/123
[58] Field of Search .................. 351/41, 156, 157, 351/43, 158, 111, 123, 119

[56] References Cited

U.S. PATENT DOCUMENTS

| | | | |
|---|---|---|---|
| 182,013 | 9/1876 | Andross . | |
| 1,026,272 | 5/1912 | Leveque . | |
| 1,819,738 | 8/1931 | Daniels . | |
| 4,006,974 | 2/1977 | Resnick | 351/59 |
| 4,129,362 | 12/1978 | Lorenzo | 351/156 |
| 5,016,999 | 5/1991 | Williams | 351/41 |
| 5,218,384 | 6/1993 | Nakamats | 351/156 |
| 5,313,671 | 5/1994 | Flory | 351/43 |
| 5,406,340 | 4/1995 | Hoff | 351/156 |
| 5,555,038 | 9/1996 | Conway | 351/159 |

*Primary Examiner*—Hung X. Dang
*Attorney, Agent, or Firm*—LaMorte & Associates P.C.

[57] ABSTRACT

An eyeglass assembly that supports lenses over the eyes without the use of a nose bridge or any other structure that rests upon the nose. The assembly includes a temple element having a first end and a second end that extends around the back of the head. A first lens frame element or lens is coupled to the first end of the temple element. Similarly, a second lens frame element or lens is coupled to the second end of the temple element. As a result, the temple element supports the first lens frame element or lens and the second lens frame element or lens a predetermined distance apart over the eyes. No structure extends across the gap over the nose. The temple element is biased against the sides of the head to help retain the assembly in place.

19 Claims, 7 Drawing Sheets

Fig. 6

EYEGLASSES WITH HEAD EMBRACING TEMPLE

BACKGROUND OF THE INVENTION

1. Field of the Invention

The present invention generally relates to the field of eyeglass frames that support lens elements over the eyes. More particularly, the present invention relates to the manner by which the eyeglass frames engage the head of a person wearing the eyeglasses.

2. Prior Art Description

Conventional eyeglass frames contain three major components. These components include lens frame elements, a nose bridge, and temple elements. The lens frame elements engage and support lenses in front of the eyes. The lens frame elements are joined together by the bridge that passes over the nose of the person wearing the eyeglasses. Lastly, temple elements extend from the sides of the lens frame elements and pass over the ears of the person wearing the eyeglasses. The temples and the bridge of the eyeglasses function together to keep the eyeglasses in place so that the lenses supported by the eyeglasses remain oriented over the eyes of the wearer. The bridge of conventional eyeglasses commonly contain nose pads that contact the nose. The weight of the eyeglasses are transferred to the nose through the structure of the bridge and the nose pads that extend from the bridge. The bridge therefore rests upon the nose of the person wearing the eyeglasses and prevents the eyeglasses from falling down below the eyes. The temples of the glasses commonly have curved ends that pass around the back of the ears. The temples of the eyeglasses therefore engage the ears and prevent the eyeglasses from moving forward on the face.

Although the temples and bridge elements of eyeglasses are intended to retain eyeglasses in place, eyeglasses are also designed to be easily removed. Accordingly, the degree of attachment provided by the temple and bridge elements of eyeglasses is minimal. This minimal degree of physical attachment causes problems when the person wearing the eyeglasses exercises or otherwise participates in activities that create rapid head movements. During sports and other physical activities, movements of the head create forces on the eyeglasses that cause the eyeglasses to move and even fall from the head. This problem is exacerbated by the fact that sweat causes friction in between the eyeglasses and the head to be reduced. As a result, when a person is participating in physical activities and is wearing eyeglasses, that person often places an elastic tether between the temples to prevent the eyeglasses from falling. The elastic tether passes around the back of the head and biases the eyeglasses against the face. The eyeglasses therefore are much less likely to move on the face.

Many people wear contact lenses instead of eyeglasses. However, during physical activity contact lenses can also become displaced and lost. Additionally, contact lenses do not protect the eyes from injuries as do conventional eyeglasses. As a result, many people who commonly wear contact lenses opt to wear tethered eyeglasses when participating in a physical activity.

As a person wears glasses day after day, the points where the bridge contacts the nose often becomes sore. This causes the wearing of eyeglasses to become painful. Over time many people develop indentations on the nose at the points where the bridge contacts the nose. The indentations are often discolored and are obvious when the eyeglasses are removed. Even people who wear eyeglasses for short periods of time develop indentations in the skin at the points where the bridge rests against the skin. These indentations may last for a few hours even after the eyeglasses are removed. Consequently, even if a person who normally wears contact lenses wears eyeglasses for an athletic event, that person would have to endure unsightly indentations on the nose well after the athletic event was over. The degree of indentations may be made worse by the use of the tether to hold the eyeglasses in place. Tethers bias the eyeglasses against the face. Consequently, the pressure of the bridge against the nose is increased and the degree of skin indentation caused by the bridge is therefore also increased.

In the prior art, there have been attempts to design glasses that do not have a bridge and do not leave indentations on the nose when worn. Such prior art devices are exemplified by U.S. Patent No. 5,016,999 to Williams, entitled DISCRETE LENS EYEGLASSES and U.S. Patent No. 4,006,974 to Resnick, entitled EYEGLASS STRUCTURE. In both of these prior art references, lenses are affixed to the face with a chemical adhesive. As a result, a great amount of effort is required to set the eyeglasses in place. Furthermore, the presence of adhesive in contact with the skin requires that the adhesive be removed with a solvent when the glasses are removed. Concerns are also present in regard to skin irritation caused by either the adhesive or the adhesive solvent.

A need therefore exists in the art for an eyeglass frame structure that does not cause indentations on the skin of the face and does not require the use of adhesives on the skin of the face. A need also exists for an eyeglass frame structure that better attaches to a person's head so that a tether need not be used when a person participates in an athletic activity. These needs are met by the present invention as described and claimed below.

SUMMARY OF THE INVENTION

The present invention is an eyeglass assembly that supports lenses over the eyes without the use of a nose bridge or any other structure that rests upon the nose. The assembly includes a temple element having a first end and a second end that extends around the back of the head. A first lens frame element or lens is coupled to the first end of the temple element. Similarly, a second lens frame element or lens is coupled to the second end of the temple element. As a result, the temple element supports the first lens frame element or lens and the second lens frame element or lens a predetermined distance apart over the eyes. Consequently, an open gap exists in between the eyes. No structure extends across the gap over the nose. The temple element is biased against the sides of the head to help retain the assembly in place. Since no portion of the assembly is supported by the nose, the assembly leaves no indentation marks in the skin of the nose. Furthermore, the use of a single temple element that extends around the head prevents the eyeglass assembly from falling off the face during sports or other activities.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

The present invention is an eyeglass frame assembly that does not contain a bridge. Since no bridge is present, the weight of the eyeglass frames are not supported by the nose. Consequently, no indentations are left on the nose from a point of contact with the bridge. The eyeglass frame assembly of the present invention can be manufactured in a nearly infinite amount of different styles. Furthermore, the eyeglass frame assembly of the present invention can be adapted to other types of eye coverings such as safety goggles and swimming goggles. The embodiments described below are shown for exemplary purposes only and are intended to set forth only a few of the configurations into which the present invention eyeglass frames can be formed.

Figure 1:
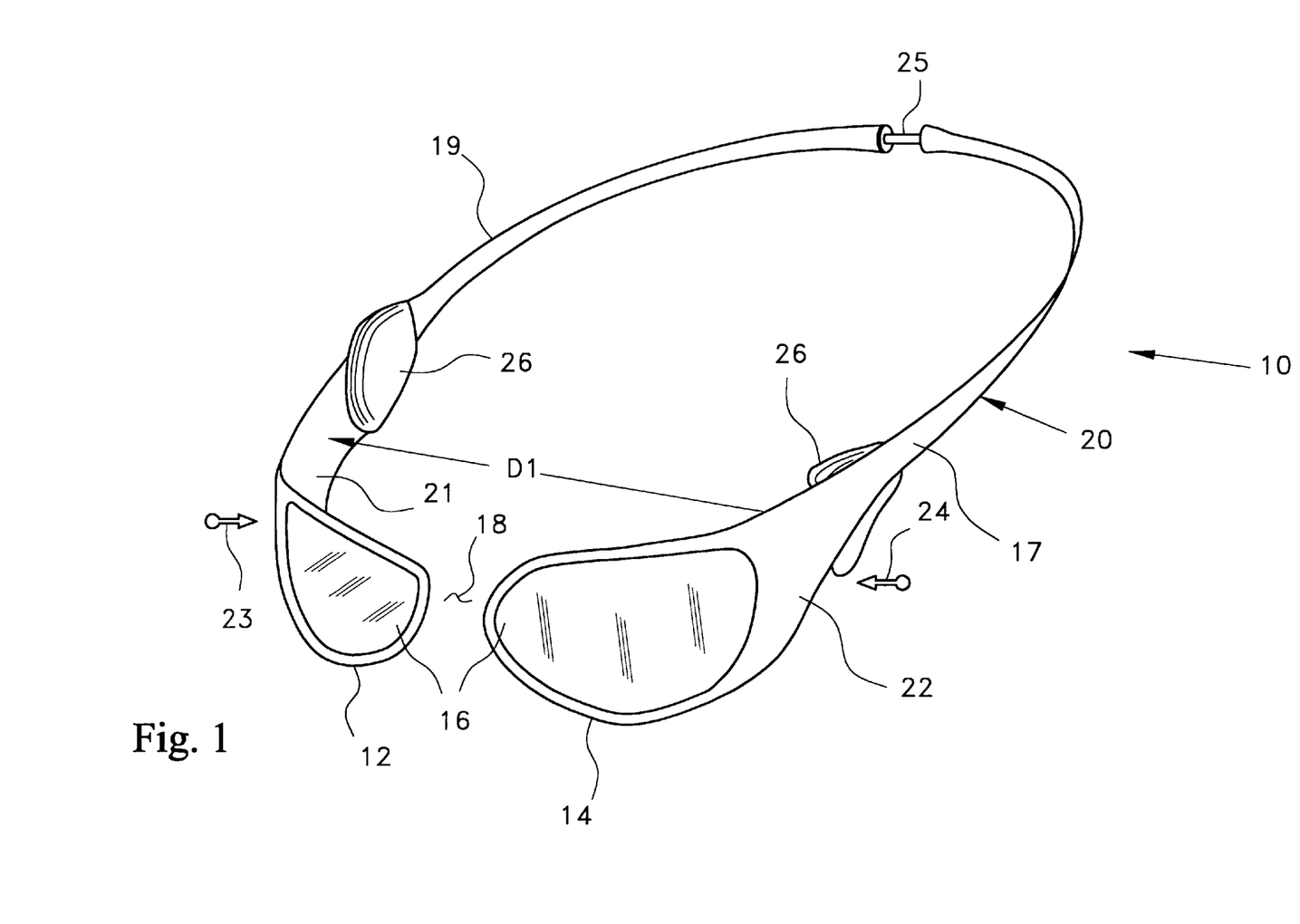
FIG. 1 is perspective view one preferred embodiment of an eyeglass frame assembly in accordance with the present invention.

Referring to FIG. 1, a first exemplary embodiment of the present invention eyeglass frame assembly 10 is shown. The eyeglass frame assembly 10 includes two lens frame elements 12, 14 that are adapted to receive and retain lenses 16. The lenses 16 can be any lenses such as prescription lenses, sun filtering lenses or safety lenses. The two lens frame elements 12, 14 are not joined by a bridge. Rather, an open gap 18 separates the two lens frame elements 12, 14 at the point where the two lens frame elements 12, 14 are closest together.

The two lens frame elements 12, 14 are joined together by a temple assembly 20. The temple assembly can be a single continuous element. However, in the shown embodiment, the temple assembly is comprised or two side elements 17, 19 that join at the back of the head to create a continuous assembly that passes around the head. The temple assembly 20 has two ends 21, 22. Each of the temple assembly's ends 21, 22 is affixed to one of the lens frame elements 12, 14. As a result, the temple assembly 20 is the sole means of support for the lens frame elements 12, 14. In the shown embodiment, the temple assembly 20 is tapered, having a wide region proximate both of its two ends 21, 22 and a narrow region in between the two ends. The narrow region of the temple assembly 20 preferably has a spring constant that acts to bias the two ends 21, 22 of the temple assembly 20 in a set orientation a predetermined distance D1 apart. The predetermined distance D1 is preferably smaller than the width of a person's head. If the ends 21, 22 of the temple assembly 20 are spread wider than predetermined distance D1, the spring constant of the temple assembly 20 will cause the ends 21, 22 of the temple assembly 20 to be biased toward one another in the directions of arrow 23 and arrow 24. As a result, as the eyeglass frame assembly 10 is placed around a person's head, the temple assembly 20 will press against the head.

Optional lateral cushion pads 26 are disposed on the temple assembly 20 proximate either end of the temple assembly 20. When the eyeglass frame assembly 10 is worn on the head, the lateral cushion pads 26 contact the head at a point in front of the ears. Directly behind the lateral cushion pads 26, the temple assembly 20 passes over the ear and around the back of the head. The spring bias of the temple assembly 20 causes the lateral cushion pads 26 to be biased against the head. The lateral cushion pads 26 prevent chaffing of the skin at this point of contact. The benefits of the use of the optional lateral cushion pads 26 are later explained.

The temple assembly 20 has a predetermined length in between its two ends 21, 22. That length can be selectively varied by moving the two temple side elements 17, 19 either toward one another or away from one another. In the shown embodiment, the first side element 17 contains a friction slide 25 that is received by the second side element 19. By moving the friction slide 25 in or out of the second slide element 19, the effective length of the temple assembly 20 can be changed. The use of a friction slide 25 is merely exemplary. In the prior art there are many mechanisms that are designed to change the length of semi-rigid elements. Such mechanisms include buckles, snap tabs and the like. Any such prior art mechanism can be adapted for use with the present invention.

Since the temple assembly 20 passes around the back of the head, it will be understood that the temple assembly 20 prevents the lens frame elements 12, 14 from moving forward away from the face. The eyeglass frame assembly 10 therefore is incapable of falling forward off of a person during an athletic event regardless to the presence of sweat or something else that may reduce the coefficient of friction between the eyeglass frame assembly 10 and the user's skin. The temple assembly 20 passes over the ears of the person wearing the eyeglass frame assembly 10. The ears therefore act as a natural barrier that prevents the temple assembly 20 from falling below the level of the ears on the head. As the temple assembly 20 passes around the back of the head, the temple assembly 20 passes along the lower portion of the back of the skull. Above the base of the skull, the diameter of the skull rapidly expands. The expansion of the skull also acts as a natural barrier that prevents the temple assembly 20 from pivoting about the ears and rising in the back of the head. Lastly, the lateral cushion pads 26 contact the head. The lateral cushion pads 26 also act to prevent the temple assembly 20 from pivoting about the ears. Furthermore, since the lateral cushion pads 26 are disposed near the lens frame elements 12, 14 the lateral cushion pads 26 act to stabilize the lens frame elements 12, 14. This helps reduce movement of the lens frame elements 12, 14 in any direction and serves to reduce vibrational shaking in the lens frame elements 12, 14. The use of lateral cushion pads 26 also prevents the temple assembly 20 from pressing against the skin on the sides of the head when worn. By providing lateral cushion pads 26, the inward bias of the temple assembly 20 is distributed across the area of the lateral cushion pads 26. The enlarged area of contact with the skin provided by the lateral cushion pads 26 makes the overall eyeglass frame assembly 10 comfortable to wear and prevents the development of skin indentations and/or irritation.

Figure 2:
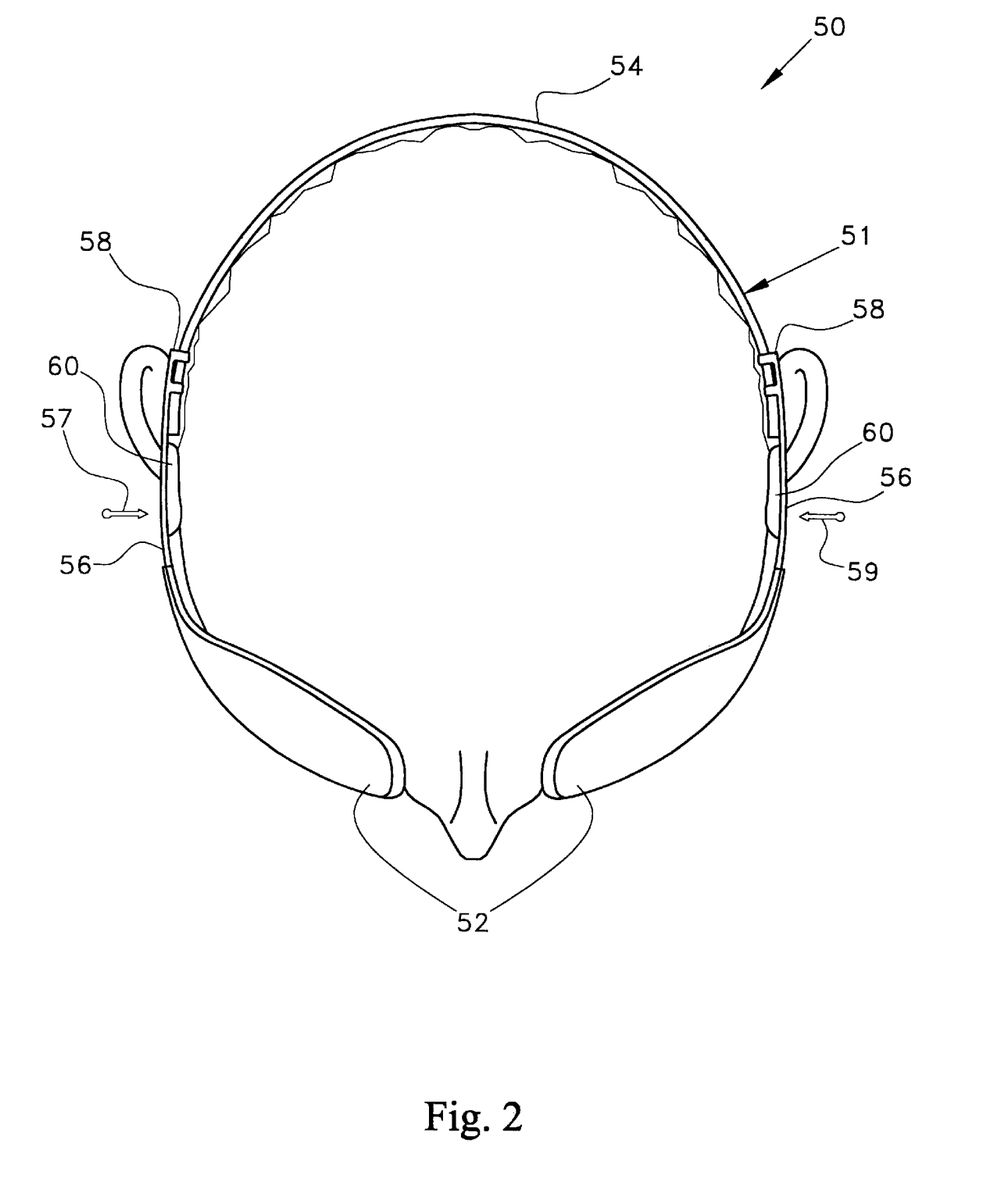
FIG. 2 is a top view of one preferred view of an eyeglass assembly in accordance with the present invention.

Referring to FIG. 2, an alternate embodiment of an eyeglass assembly 50 in accordance with the present invention is shown. In this embodiment, no lens frame elements are used. Rather, a temple assembly 51 connects directly to two lenses 52. The lenses 52 can be prescription lenses, light filtering lenses and/or safety lenses. The lenses 52 partially curve around the sides of the head. The formation of prescription lenses that partially curve around the head is found in U.S. Patent No. 5,555,038 to Conway, the disclosure of which is herein incorporated by reference.

The temple assembly 51 supports the lenses 52 over the eyes so that no bridge is required. Consequently, the temple assembly 51 is the only structure supporting the lenses 52 on the head. In the shown embodiment, the temple assembly 51 is a three piece structure. The temple assembly 51 contains a spring band 54 that passes around the back of the head. A side temple element 56 connects to either end of the spring band 54. The side temple elements 56 are affixed to the lenses 52 and support the lenses 52 over the eyes. A slide structure 58 is disposed at the end of each of the side temple elements 56 opposite the lenses 52. The spring band 54 passes through each of the slide structures 58. By varying the amount of the spring band 54 passing through the slide structure 58 on each side temple element 56, the overall length of the temple assembly 51 can be varied in between the lenses 52. Consequently, the eyeglass assembly 50 can be selectively adjusted to fit the specific head proportions of the wearer.

The spring band 54 provides a bias to the overall temple assembly 51 that biases the side temple elements 56 in the direction of arrow 57 and arrow 59. The bias causes the lateral cushion pads 60 to press against the sides of the head. The friction in between the lateral cushion pads 60 and the skin helps keep the overall eyeglass assembly 50 properly oriented on the head.

Figure 3:
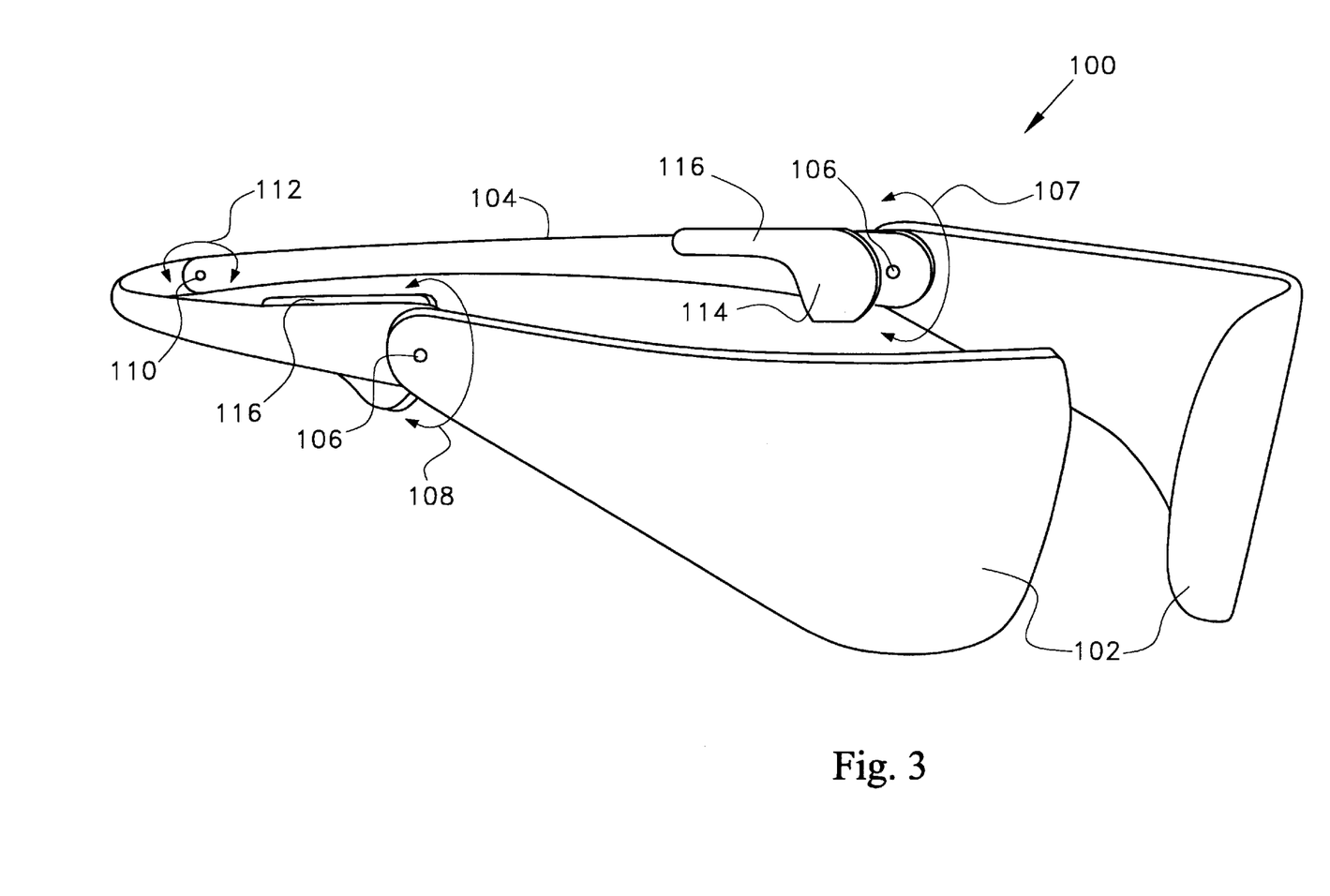
FIG. 3 is a perspective view of an alternate embodiment of an eyeglass assembly in accordance with the present invention.

Referring to FIG. 3, another alternate embodiment of an eyeglass assembly 100 is shown in accordance with the present invention. In this embodiment, lens elements 102 are provided that extend over the eyes and bend around the sides of the head. The end of each of the lenses 102 is connected to one end of a temple element 104 with a pivot 106. As a result, each of the lenses 102 is capable of pivotably moving around the pivot 106 in the directions of arrow 107 and arrow 108. A pivot 110 is also disposed in the center of the temple element 104. That pivot 110 enables either side of the temple element 104 to pivot in the directions of arrow 112. The pivot 110 in the center of the temple element 104 therefore enables the overall eyeglass assembly 100 to be folded in half. The presence of the pivots 106 at the ends of the temple element 104 enables the eyeglass assembly 100 to then be folded in quarters for easy pocket storage.

In FIG. 3, it can be seen that the lateral cushion pads 114 include a leg 116 that extends along the temple element 104 toward the rear of the temple element 104. The legs 116 of the lateral cushion pads 114 would therefore pass over the tops of the ears when the eyeglass assembly 100 is worn. The legs of the lateral cushion pads 116 therefore cushion the weight of the eyeglass assembly 100 against the ears and make the eyeglass assembly 100 more comfortable to wear.

Figure 4:
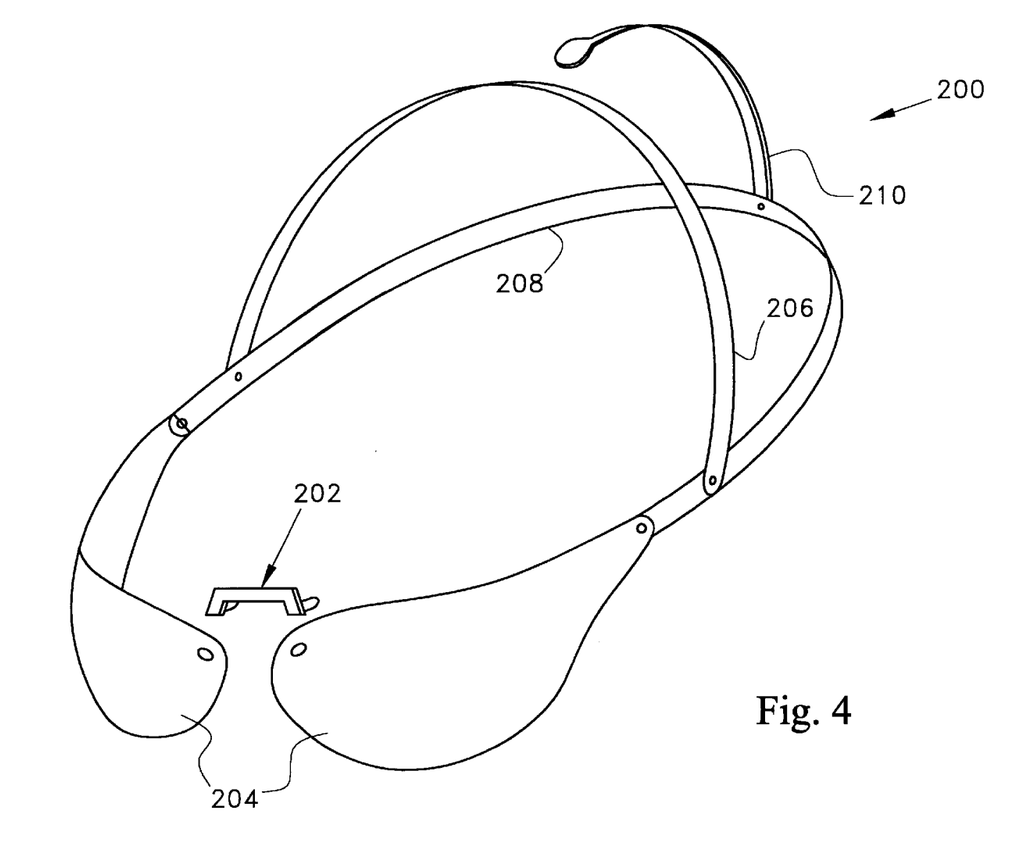
FIG. 4 shows some peripheral attachments that can be affixed to different embodiments of the present invention.

Referring to FIG. 4, some of the peripheral items that can be used with the present invention are shown. In the embodiment of eyeglasses 200 illustrated, a removable bridge element 202 is shown. The bridge element 202 is capable of temporarily interconnecting the two lens elements 204 or frames that support the lens elements. The bridge element 202 does not rest upon the nose or any other portion of the face. Rather, when used, the bridge element 202 acts only to prevent the two lens elements 204 from moving apart from one another. The bridge element 202 would therefore be desirable when playing a contact sport such as football or soccer where the eyeglasses 200 my be directly impacted.

FIG. 4 also shows two styles of optional head supports. In the first style, a curve support element 206 extends from one point on the temple element 208 to another. When worn, the support element 206 would pass over the top of the head and would prevent the eyeglasses 200 from being inadvertently knocked off the face. The second style of optional head support is a single pawl support 210 that extends upwardly from the temple element 208. The pawl support 210 terminates at some point on top of the head and also acts to better retain the eyeglasses 200 in place.

Figure 5A:
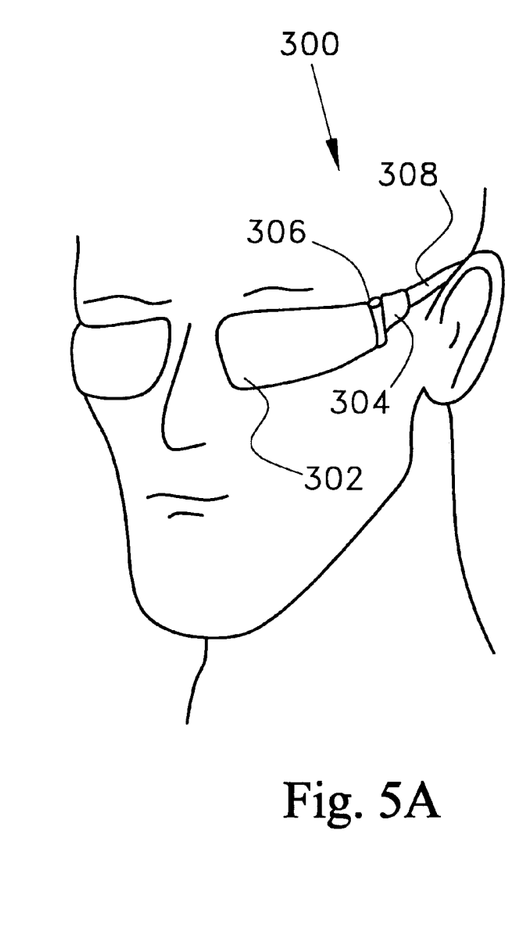
FIG. 5A–5D shows a second alternate embodiment of an eyeglass assembly in accordance with the present invention.
Figure 5B:
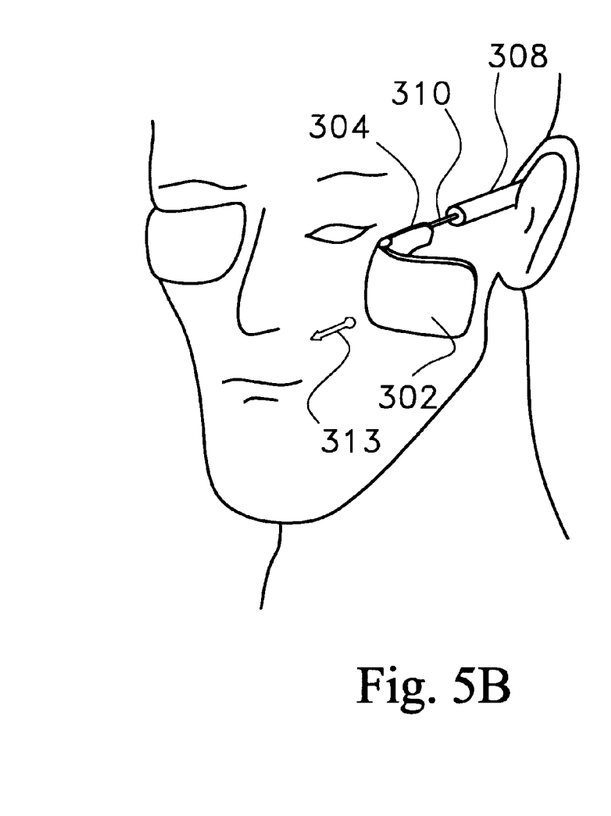

Referring to FIG. 5A, yet another embodiment of an eyeglass assembly 300 is shown in accordance with the present invention. In this embodiment, lenses 302 are connected to side temple elements 304 with hinges 306. The side temple elements 304 are attached to a rear temple element 308 by a sliding pivot post (not shown). With this configuration, the eyeglass assembly can be worn in the following manner. Referring to FIG. 5B, it can be seen that the sliding pivot post 310 affixed to the side temple element 304 can be pulled away from the rear temple element 308 in the direction of arrow 313. The lens 302 and side temple element 304 can then be rotated 180° about the sliding pivot post 310 from its initial position to the orientation shown.

Figure 5C:
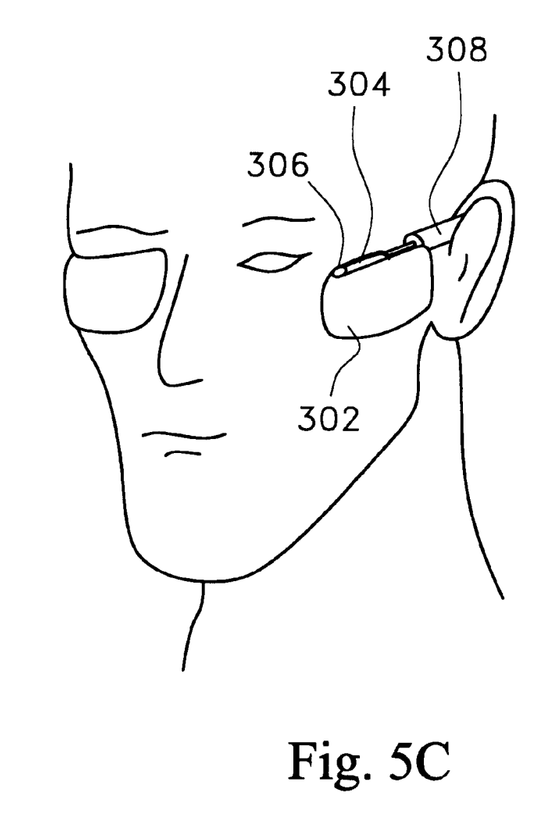
Figure 5D:
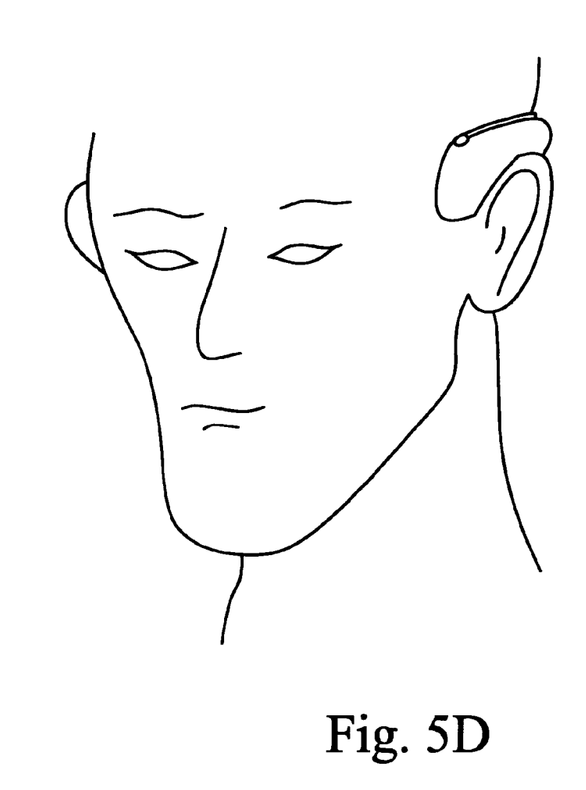

Referring to FIG. 5C, it can be seen that the lenses 302 can be folded against the side temple element 304 along the hinge 306. The side temple element 304 can then be retracted back into the rear temple element 308 and the lens can be placed over the ears as is shown in FIG. 5D.

Figure 6:
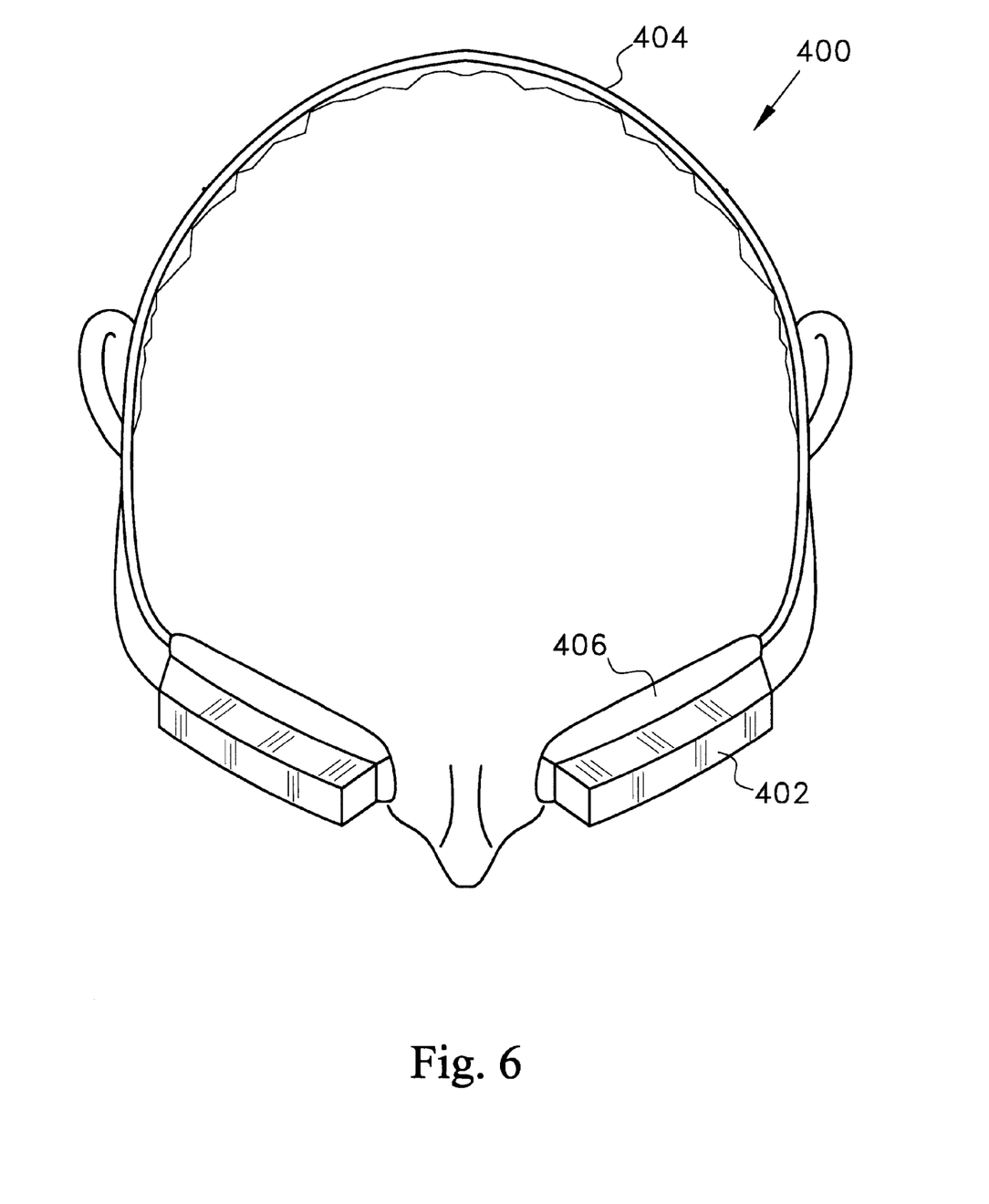
FIG. 6 is a top view of swimming goggles in accordance with the present invention.

Referring to FIG. 6, a pair of swimming goggles 400 are shown in accordance with the present invention. The goggles 400 contain lens elements 402 that are supported by a single temple element 404. No lateral cushion pads are present in order to maintain a close fit in between the structure of the goggles 400 and the face. A sealing material 406, such as an elastomeric foam is disposed in between the lens elements 402 and the face in order to create a water impervious seal around the eyes. Again, no bridge element is present that rests upon the nose. The lenses are retained over the eyes by the bias of the temple element 404 against the head and the passage of the temple element 404 over the ears.

It will be understood that the embodiments of the present invention described and illustrated herein are merely exemplary and a person skilled in the art can make many variations to the embodiments shown without departing from the scope of the present invention. All such variations, modifications and alternate embodiments are intended to be included within the scope of the present invention as defined by the appended claims.

What is claimed is:

1. An eyeglass assembly, comprising:
   a left lens element for covering at least a portion of the left eye;
   a right lens element for covering at least a portion of the right eye;
   a temple element having a first end coupled to said left lens element and a second end coupled to said right lens element, wherein said temple element passes over the ears of a person wearing the eyeglasses at a first point and second point, respectfully, and wherein said temple element supports said left lens element and said right lens element a predetermined distance apart over the eyes so that an open gap exists in between said left lens element and said right lens element in between the eyes;
   first cushion pads coupled to said temple element between said right lens element and said first point:
   a second cushion pad coupled to said temple element between said left lens element and said second point:
   wherein said first cushion pad and said second cushion pad both include a large padded area that is biased against the head of the wearer by said temple element and a smaller padded area that sasses over the too of the ears, whereby the smaller padded area separates said temple element from the ton of the wearer's ears.

2. The assembly according to claim 1, wherein said left lens element and said right lens element are selected from a group consisting of prescription lenses, sun filtering lenses, swimming lenses and safety lenses.

3. The assembly according to claim 1, further including a left lens frame and a right lens frame into which mount said left lens element and said right lens element, respectively, wherein said temple element extends between said left lens frame and said right lens frame.

4. The assembly according to claim 1, further including at least one hinge disposed on said temple element at a point generally midway between said first end and said second end, wherein said hinge enables said spring band to be selectively folded in half so that one half of said temple element lays against the other half of the temple element in a common curved orientation.

5. Eyeglasses for supporting lens elements over the eyes of a person, comprising:

a generally semicircular spring band having a first end, a second end and a midpoint, wherein said spring band has a first half, defined between said first end and said midpoint, and a second half, defined between said second end and said midpoint;

a first hinge disposed in said spring band between said first half and said second half, wherein said first hinge enables said spring band to be selectively folded in half so that said first half of said spring band and said second half of said spring band abut in a common curved orientation;

a first lens element supported by said first end of said spring band; and a second lens element supported by said second end of said spring band;

wherein said spring band supports said first lens element and said second lens element over the eyes so that an open gap exists in between said first lens element and said second lens element in between the eyes.

6. The eyeglasses according to claim 5, wherein said spring band embodies a spring constant that biases said first lens element and said second lens element into a position a predetermined distance apart.

7. The eyeglasses according to claim 5, wherein said spring band has a predetermined length in between said first end and said second end and said eyeglasses further includes a mechanism for selectively varying said predetermined length.

8. The device according to claim 5, further including cushion pads coupled to said spring band proximate said first end and proximate said second end.

9. The eyeglasses according to claim 8, wherein said cushion pads include a segment that passes over the ears when said eyeglasses are worn, wherein said segment of said cushion pads rests on the ears and support the spring band.

10. The eyeglasses according to claim 5 further including material extending from said first lens element and said second lens element that is capable of creating a water impervious seal around each eye.

11. The device according to claim 5, further including a removable connector element that selectively interconnects said first lens element and said second lens element across said open gap.

12. The eyeglasses according to claim 5, wherein said first lens element is coupled to said first end of said spring band with a second hinge that enables said first lens element to be folded against said first half of said spring band.

13. The eyeglasses according to claim 12, further including at least one rigid secondary support element extending upwardly from said temple element.

14. The eyeglasses according to claim 13, wherein said at least one rigid secondary support element is curved and extends from one point on said spring band to a second point on said spring band.

15. The eyeglasses according to claim 12, wherein said second lens element is coupled to said second end of said spring band with a third hinge that enables said second lens element to be folded against said second half of said spring band.

16. The eyeglasses according to claim 15, wherein said first lens element and said second lens element generally share the same common curved configuration as does said first half of said spring band and said second half of said spring band.

17. The eyeglasses according to claim 5, wherein said first lens element is mounted in a first frame element and said second lens element is mounted in a second frame element.

18. The eyeglasses according to claim 17, wherein said first frame element is coupled to said first end of said spring band and said second frame element is coupled to said second end of said spring band.

19. The eyeglasses according to claim 18, wherein said first frame element and said second frame element are pivotably coupled to said first end and said second end of said spring band, respectively.

* * * * *